(12) United States Patent
Holden (10) Patent No.: US 10,129,041 B2
(45) Date of Patent: Nov. 13, 2018

(54) END TO END MULTICAST (71) Applicant: Comcast Cable Communications, LLC, Philadelphia, PA (US)

(72) Inventor: Danial Holden, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 345 days.

(21) Appl. No.: 13/631,117

(22) Filed: Sep. 28, 2012

(65) Prior Publication Data
US 2014/0095924 A1 Apr. 3, 2014

(51) Int. Cl.
*H04N 21/239* (2011.01)
*H04N 21/258* (2011.01)
*H04N 21/422* (2011.01)
*H04N 21/488* (2011.01)
*H04N 21/647* (2011.01)
*H04L 12/18* (2006.01)

(52) U.S. Cl.
CPC ...... *H04L 12/1868* (2013.01); *H04L 12/1895* (2013.01)

(58) Field of Classification Search
None
See application file for complete search history.

(56) References Cited

U.S. PATENT DOCUMENTS

| | | | |
|---|---|---|---|
| 6,831,917 B1 | 12/2004 | Cheriton | |
| 2005/0085257 A1* | 4/2005 | Laird et al. | 455/550.1 |
| 2005/0101286 A1* | 5/2005 | Macolly, Jr. | G06Q 10/06311 455/403 |
| 2007/0157258 A1* | 7/2007 | Jung | H04N 21/43615 725/80 |
| 2008/0092199 A1* | 4/2008 | McCarthy | H04N 7/165 725/133 |
| 2008/0120639 A1* | 5/2008 | Walter | G08B 27/005 725/33 |

(Continued)

FOREIGN PATENT DOCUMENTS

| | | |
|---|---|---|
| CA | 2828592 | 9/2013 |
| EP | 13186666 | 9/2013 |
| WO | 02067120 A1 | 8/2002 |

OTHER PUBLICATIONS

Partial European Search Report—EP 13186666.7—dated Apr. 1, 2015.

(Continued)

*Primary Examiner* — Nnenna Ekpo
*Assistant Examiner* — Jean D Saint Cyr
(74) *Attorney, Agent, or Firm* — Banner & Witcoff, Ltd.

(57) ABSTRACT

IP multicast enabled devices, systems and methods for use on an end-to-end IP multicast-enabled network are disclosed. An IP multicast system, device and method operable on the network includes an IP multicast-engine, and storage for storing instruction sets to instruct the engine to send messages according to a select multicast application. A plurality of devices become members of an IP multicast group such that sending a message to a single multicast address can provide for the concurrent control of, and the delivery of the multicast message to, the devices of the group. Error conditions in a multicast source may be handled by preserving the multicast session resources, and reassigning a multicast source address from a faulty source encoding device to an alternate device.

18 Claims, 6 Drawing Sheets

(56) References Cited

U.S. PATENT DOCUMENTS

2011/0010090 A1* 1/2011 Bae ........................ G01C 21/00
                                                            701/532
2011/0051726 A1   3/2011 Bejerano et al.
2014/0337906 A1* 11/2014 Staniec et al. ................ 725/109

OTHER PUBLICATIONS

Response to European Search Report—EP Appl. 13186666.7—submitted Feb. 12, 2016.
European Extended Search Report—EP 13186666.7—dated Jul. 22, 2015.

* cited by examiner

END TO END MULTICAST

BACKGROUND

Content delivery networks rely on a variety of interconnected routers and caches for the delivery of their content to requesting users. Unfortunately, when a component in the delivery network fails, significant problems can occur in the management of resources to recover from the failure. There remains an ever-present need to gracefully handle delays caused by such component failures.

Furthermore, there remains an ever-present need for generally improved data network experiences.

SUMMARY OF THE DISCLOSURE

Methods, systems, and devices are disclosed for IP multicast technology. The system and device may include an IP multicast application engine having a processor and memory operable on one or more provider's end-to-end IP enabled network(s), and storage for storing application instruction sets which, when executed on the processor are operable to cause the application engine to multicast messages such as multimedia content, text and the like for substantially simultaneous consumption display(s) on a plurality of select end user devices, such as a select group, and/or control signals such as for powering up or coordinating the operation of a plurality of remotely controllable end user devices, according to a selected IP multicast application. The IP multicast application may thus provide for such concurrent operation and/or control of a plurality of devices such as customer premise equipment (CPE) devices communicatively coupled to the network.

Methods for IP multicast are also disclosed. Such methods may include processing a content or control message obtained by an IP multicast application engine on a provider end-to-end IP enabled network according to a selected IP multicast application to provide an outgoing IP multicast message, and transmitting the message to an IP multicast address. Computer readable media are also disclosed that store computer readable instructions which, when read by a computer, may instruct the computer to perform the disclosed methods.

In some embodiments, an error condition in a multicast session may be checked to determine whether the error is in the source device for the content in the session, as opposed to the error residing in the delivery network between the source and the receiving client. If the error is in the source, then the network address (e.g., the multicast IP address) of the faulty source device may simply be reassigned to an alternate source device. The multicast session may resume, using the same multicast address and other resources as before.

Therefore, the disclosure provides in various aspects a multicast IP distribution device, system and method that increase network bandwidth efficiency, that allow the use of triggers to remotely control devices, such as CPEs, and that may be implemented in one or more networks such as provider network(s).

BRIEF DESCRIPTION OF THE DRAWINGS

Understanding of the disclosure will be facilitated by consideration of the following detailed description of exemplary embodiments, taken in conjunction with the accompanying drawings, in which like numerals refer to like parts and in which.

DETAILED DESCRIPTION

The figures and descriptions have been simplified to illustrate elements that are relevant for a clear understanding, while eliminating, for the purpose of brevity, many other elements found in IP multicast networks, devices, systems, and methodologies. Those of ordinary skill in the art may recognize that other elements and/or steps may be desirable and/or required in implementing the disclosure. However, for purposes of brevity, a discussion of such elements and steps is not provided herein. The embodiments identified and illustrated herein are for exemplary purposes only, and are not meant to be exclusive or limited in their description.

The disclosed systems and methods are operative in an end-to-end IP multicast enabled network, such as a network that extends a content and/or service provider's multicast backbone directly to IP enabled end user devices. An existing network, such as a non-multicast network, may be modified to support end-to-end multicast traffic to IP enabled Customer Premises Equipment (CPE) devices, such as user devices, to use the disclosed systems and methods. Distribution methodologies are disclosed that permit multicast traffic to traverse, for example, a multicast backbone directly to end user devices with acceptable data safety and reliability. Such an end-to-end multicast network may support applications that compete with, supplant, or augment other types of communications, such as local broadcasts. A multicast network as disclosed herein may also be used to support new applications not currently available using other types of systems and methods.

Numerous aspects of systems and networks are referred to with reference to the figures, and consequently a summary of the interoperation of such aspects is provided herein. The present disclosure is directed to multicast solutions for various systems, such as satellite, fiber optic, coaxial cable, wireless, and hybrid systems. The disclosure relates to Asynchronous Transfer Mode (ATM), Digital Subscriber Line Access Multiplexer (DSLAM), or Asymmetric Digital Subscriber Line (ADSL), and other architectures. The present disclosure is operable and may be implemented on any network architecture and/or provider network(s) that may support the disclosed aspects of multicast. Furthermore, various known multicast protocols may be employed in association with the disclosure, such as WiCast WiFi Multicast, Explicit MultiUnicast (XCAST), Internet Relay Chat (IRC), or proprietary peer-to-peer, for example, and the disclosure is also applicable to future-developed multicast protocols.

A provider may offer a plurality of services to customers (who may be paying customers, or customers using services offered free of charge) through a single transmission system. The equipment used at the end user's location for rendering, receiving and/or using those services, such as a personal computer, television, display device, smart phone, tablet computer, digital video recorder, set-top box, digital telephone, etc., may be referred to as a CPE. For example, high speed Internet access may be provided to a user device via a modem, such as a cable modem, and Voice over IP (VoIP) may be provided to a user device via the same system, for example, using a Multimedia Terminal Adapter (MTA). When both Internet and VoIP services are provided, a user device, such as an Embedded Multimedia Terminal Adapter (EMTA), may be used to combine the functionality of a modem and an MTA. Depending on capabilities and configuration, a user device may interface directly with the provider's system. Conversely, a user device that interfaces directly with the system, such as a modem, may be referred to as a Customer or Consumer Edge (CE) device. A system provider's equipment that interfaces directly with the user device, such as a termination server, may be referred to as a Provider Edge (PE) device.

A modem may be a network bridge that provides IEEE 802 (Ethernet) networking. The modem may be a CE device that bridges Ethernet frames between a user device, such as a device on a local area network (LAN), and the provider's network. The modem modulates data provided by the user device for transmission over the network, and demodulates data received from the network for use by the user device.

A data transmission system, such as that referenced above, may be described in terms of a cooperating functional layer model, such as to more simplistically describe system operations. One such model, the Open Systems Interconnection (OSI) specification, is an effort to standardize the description of networking functionality by the International Organization for Standardization (ISO) and the International Telecommunication Union (ITU). In particular, the OSI Model provides a framework for describing layered communication networks and protocols. With respect to the OSI model, a modem may be both a Physical Layer (PHY) (Layer 1) device and a Data Link Layer (Layer 2) forwarder. As an IP addressable network node, a modem may also support functionality at other model layers.

A PHY connects a Data Link Layer device to a medium, such as an optical fiber or copper cable, for example. In a modem, OSI Layer 1 may be implemented in an Ethernet PHY on the modem's LAN interface, and, in an example of a fiber optic/coaxial cable network, a Data Over Cable Service Interface Specification (DOCSIS) defined specific PHY on its interface. The Network Layer (Layer 3) may be implemented as an IP host having an IP address used by the network operator to communicate with the device. In the Transport Layer (Layer 4), the modem supports UDP using its own IP address, and supports filtering based on TCP and UDP port numbers to, for example, block forwarding of NetBIOS traffic out of the customer's LAN. In the Application Layer (Layer 7), the modem may support protocols for management and maintenance, such as Dynamic Host Configuration Protocol (DHCP) and Simple Network Management Protocol (SNMP).

A modem may incorporate a router and a DHCP server to provide the customer's LAN with IP network addressing capabilities. From a data forwarding and network topology perspective, the router may have an IP address and be logically distinct from the modem functionality, even though the two share a single enclosure and appear as one unit.

A provider may likewise provide a plurality of services using, for example, RF signals on the provider network. For example, video may be transported over a network by modulating standard analog TV channels. One analog TV channel may occupy a 6 MHz-wide frequency band in NTSC-based systems, or an 8 MHz-wide frequency band in PAL-based systems. Digital TV channels may transport video by using MPEG-2 or MPEG-4 coding over quadrature amplitude modulated (QAM) channels. To view a digitally modulated channel, CPEs such as digital televisions, computers, gateways, or STBs convert the RF signals to signals that are compatible with display devices such as televisions, cell phones or computer monitors.

A provider may also deploy an IP multicast enabled backbone over the network, as discussed below with respect to FIG. 1. To provide customers with certain services, it may be advantageous to extend the IP multicast capability directly to user device 145. This may include providing an IP multicast-enabled CE, along with IP multicast-enabled user device 145 devices within the home (e.g., routers, end-user devices, etc.). The user device 145 may be modified or adapted, such as with an appropriate adapter, to support IP multicast traffic, forming an end-to-end IP multicast system in which all devices between the content source and the content consumption device include memory for an IP multicast stack, and are configured to support IP multicast transmissions. Applications that utilize IP multicast traffic may then be implemented to communicate directly with, control, and/or synchronize a plurality of user devices.

Figure 1:
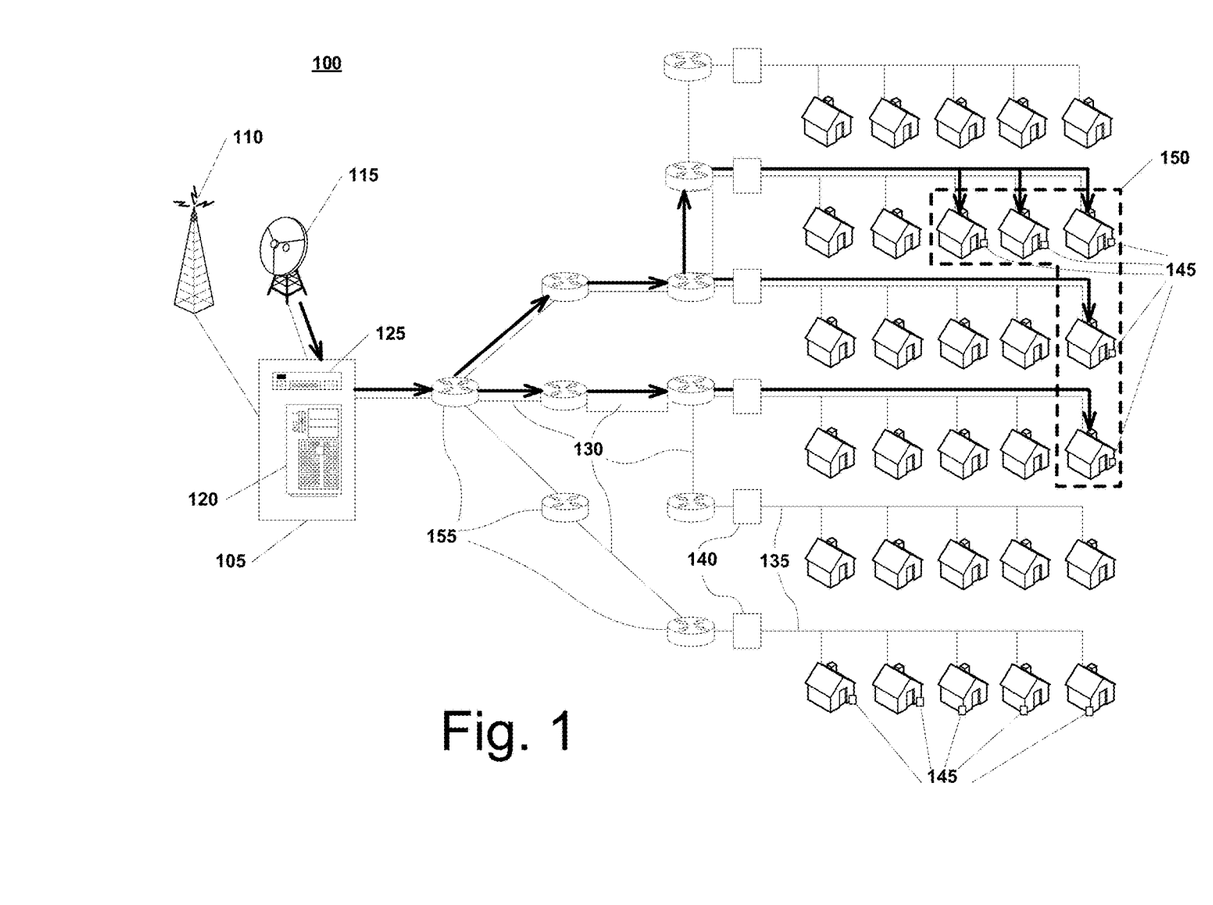
FIG. 1 is a block diagram showing an IP multicast system in accordance with an illustrative implementation of the disclosure.

The system of FIG. 1 ameliorates the shortcomings of conventional practices by providing a platform for IP multicasting which may be implemented, for example, on a provider's system. The disclosed IP multicasting platforms allow for a plurality of cooperating user devices 145 (e.g., CPEs capable of audibly playing verbal messages and/or visually displaying text, images, and/or video) to receive signals, and to be controlled and/or coordinated using a single IP multicast, or a plurality of coordinated IP multicasts. As will be described hereinafter, in an illustrative implementation, a provider IP multicast network may include an IP multicast (IPM) engine computing device operable on the network, and having at least one instruction set to instruct the IPM engine to multicast messages to an IP multicast address according to a predetermined or selected IPM process. The engine itself may be any computing device (e.g., a content server) that is configured to transmit IP traffic to an IP multicast destination address.

In an illustrative operation, the IPM engine may send control signals (e.g., embedded in an IP packet) to one or more IPM addresses to power up, activate, and/or control a plurality of properly configured, remotely controllable user devices that are members of the IPM groups having those addresses. Each of the user devices may have a different individual IP address, and user devices in an IP multicast group (IPMG) may be pre-registered members of the group. The IPMG may have a different, single IP multicast address, and IP-enabled devices in the system (e.g., routers) may store routing tables identifying, for each IP multicast address, a listing of the IP addresses for the pre-registered members of the group having the IP multicast address. In an illustrative implementation, each of a plurality of user devices may be registered to one or more IPMGs. The user devices of each IPMG may all receive a multicast message transmitted to that group, where the message may be transmitted once to a single IPM address corresponding to a single IPMG, and delivered substantially simultaneously to the members of the IPMG. In an illustrative operation, each of the user devices may respond by playing the message.

FIG. 1 depicts an exemplary IPM system 100, which may be part of a provider network, in accordance with an exemplary embodiment. As is shown in FIG. 1, IPM system 100 may include local office 105, such as a central location for system resources in an optical, coaxial cable, hybrid fiber cable, wireless, telephone, or other network, for example. The local office 105 may include one or more computing devices (e.g., servers) configured to receive data, such as video signals (movies, television programs, etc.), Internet pages, web content, voice data, Emergency Alert System (EAS) messages, Amber Alerts, and other forms of data, for processing and distribution over IPM system 100. The data may be received, for example, via an RF antenna tower 110, satellite dish 115, optical fiber line, physical media (e.g., compact disk, portable hard drive, etc.), or other means. Received data may be processed at the local office 105, such as by processing system 120, which may include one or more microprocessors, data storage, such as disk drives, memory, and the like. The processing system 120 may provide receiving and/or transmitting and modulation and/or demodulation capabilities, for example. The local office 105 may also comprise a termination system 125, which, in an exemplary system, may be a Cable Modem Termination System (CMTS), to process data signals and provide high speed data services, such as Internet access and/or VoIP.

Further, IPM system 100 may include infrastructure to distribute the signals between local office 105 and user devices 145 on communication links 130, 135. In an example embodiment of a hybrid fiber optic/coaxial cable (HFC) system, the communication links may be high capacity optical fiber segments 130 and coaxial segments 135. Optical fiber segments 130 may transmit the signals as information via Electro-Magnetic Radiation (EMR) reflecting down a glass fiber. Optical fiber segments 130 may run between local office 105 and optical nodes 140 in the vicinity of the customer premises. Coaxial segments 135 may run between optical nodes 140 and user devices 145, and the coaxial segments 135 may be tapped and drop cables run to the user devices 145 at various homes. Nodes 140 may convert between optical signals and coaxial cable electrical signals, and the electrical signals may be transmitted between nodes 140 and user devices 145. The system may provide a path for one-way communication from local office 105 to user devices 145, or for two-way communication between local office 105 and user devices 145. IPM system 100 may also include, in similar or other embodiments, various wireless devices (not shown), such as wireless communication links, RF transmitters and receivers and the like, to implement multicast.

In an exemplary operation, the provider may provide IPM data services to a group of users 150, indicated by the dashed line in FIG. 1, whose user devices have informed their respective CEs that they wish to join the multicast group. To provide certain services to customer group 150, an IPM application may be used. To implement multicast transmission, a packetized communication protocol, such as an IP communication protocol, may be used to deliver packets from a source host at local office 105 to one or more user devices 145, based on each user device address. Data from an upper layer protocol, such as application data, may be parsed and encapsulated as packets at local office 105, such as by processing system 120.

IP may be used in conjunction with other protocols, such as TCP or UDP. TCP provides delivery of a data stream from a program on one computer to another program on another computer, including error correction mechanisms to ensure safe delivery of communication packets. UDP uses a simpler transmission model without guaranteeing packet delivery, ordering, or data integrity. UDP can thus complete communications more quickly than reliable protocols such as TCP, and entails less network traffic. UDP may therefore be advantageously used in certain applications. For example, UDP may be used in scenarios in which it is important to avoid network congestion, or to complete communications quickly, or where reliability is not needed. Illustratively, the disclosed IPM system 100 may implement the selected multicast application on top of UDP.

Because IP is a connectionless protocol, routing of packets is used to deliver data packets to a destination. Routing is the process of selecting paths in a network along which to send network traffic, using packet switching. In packet switching networks, routing directs packet forwarding. Packet forwarding is the transit of logically addressed packets from a source toward an ultimate destination through intermediate routers, such as routers 155 (which may include additional modem termination circuitry to communicate with the local office 105 or another node or router). A router may receive an input packet, and output the packet to its destination (or to another router that is one step closer to the ultimate destination). Routers may forward packets based on routing tables, for example, which maintain a record of the routes to various network destinations and which inform the router of the next router that is closer to the packet's ultimate destination.

For multicast packets, the sender of the packet can transmit the packet to a destination address that corresponds to the multicast group. Prior to transmission of data, interested user devices 145 may register or may be registered as members of an IPMG comprising user devices at customers in group 150 (hereinafter referred to as multicast group 150) having a single multicast address. Registration may be initiated by the user devices 145, by network routers 155, or by local office 105, such as by a registration facility of processing system 120, and can result in the IP-enabled routers storing a routing table that identifies the requesting user devices as being subscribed to the multicast group address. During the multicast, the sender sends each multicast packet to the multicast address of multicast group 150, and the routers 155 forward the packets to the user devices 145 of multicast group 150, making copies of the packets as needed and sending the packets to all user devices 145 that are registered members of the multicast group 150.

Each router 155 sends each received packet and its copies, if any, substantially simultaneously to all of its output ports that lead most directly to user devices 145 downstream from that router. The source address may be used by the routers to determine data stream direction. The source is considered upstream from each router 155. Each router 155 may consult its routing tables to determine which interfaces are downstream for the multicast group 150 associated with the multicast address, and sends the packet out through the downstream interfaces. The router 155 may make copies of the packet to enable the packet to be sent out through all appropriate interfaces at substantially the same time.

Figure 2:
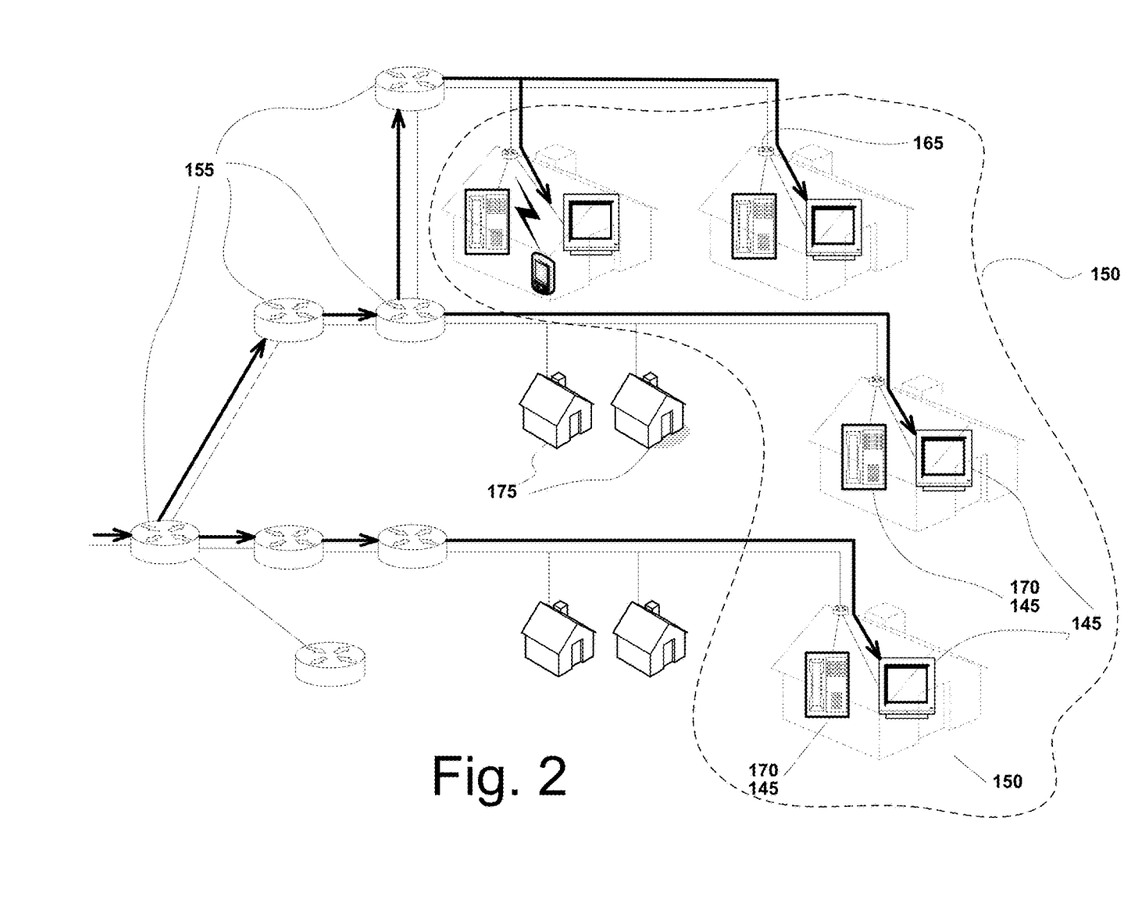
FIG. 2 is a block diagram showing exemplary components of the exemplary IP multicast system of FIG. 1, in accordance with an illustrative implementation of the disclosure.

As illustrated in FIGS. 1 and 2, a provider may multicast content (e.g., audiovisual content for a television show, a movie, an EAS or Amber Alert message to interrupt an ongoing television program, etc.) to an IP multicast group (IPMG) 150 of registered user devices (e.g., CPEs that are members of the IPMG, such as digital video recorders who have tuned to a particular television program). The message may be provided by a message creator at another location, and be received by the provider, such as via antenna tower 110 or satellite dish 115. Alternatively, the message may be provided at local office 105, for example by an administrator, or generated automatically responsive to certain determined criteria. In an illustrative operation, a message is received via satellite dish 115 and provided to local office 105. Local office 105 processes and packetizes the message via processing system 120, and sends the packets in serial order to a single multicast address. Routers 155 between the local office 105 and registered user devices of IPMG 150 receive the message packets via respective input ports, determine the appropriate output ports to the registered destinations in accordance with their respective routing tables, and send the packets through the output ports, making as many copies of the message packets as needed to send the copied, received packets to each output port. In FIGS. 1 and 2, the path taken by the multicast message packets is indicated by bold arrows.

FIG. 2 illustrates that a customer premise may have multiple user devices 160, 170. As shown, the multicast message is directed to devices 160, such as a television or a handheld display device, located at each customer premise, but not to voice devices 170, such as a telephone, smart phone, etc., at the same premises. Every user device 145 connected to the network that is able to receive multicast IP packets has its own unique IP address, and that address may be used to register or associate that user device as a member of one or more IPMGs 150. In an end-to-end IP multicast environment, CE devices may also perform a routing function or the equivalent, as indicated by CE routers 165. In FIG. 2, an exemplary IP multicast message includes a video message sent to video devices 160 that are members of the IPMG 150, which illustratively includes the video devices 160 within the dashed line. User devices that are not members of IPMG 150, such as voice devices 170, do not receive the message. Further, video devices at customer premises 175 that are not members of IPMG 150 (e.g., that are outside of dashed line 150) do not receive the message.

In the illustrative operation, local office 105 sends the message to one or more user devices 145 (e.g., through cooperation between local office 105, user devices 145, and intermediate routers 155 as described hereinabove). Any of user devices 145 may be configured to cooperate with an IPM engine (not shown) to execute an IPM application that enables a message to be multicast by local office 105 to one or more of user devices 145.

In an illustrative implementation, the user devices 145 may be members of IPMG 150, such as within a geographic area as may be indicated by dashed line 150. An IPMG may include video devices 160, voice devices 170, and/or other user devices 145 at the customer premises within group 150, provided that the individual user devices 145 register or are registered as members of the particular IPMG 150 of interest. An incoming message sent to the appropriate IP multicast address is multicast to the members of IPMG 150, such that each member of IPMG 150 receives the incoming message. In the illustrative implementation, IPMG 150 may be used to display or play the same message on a plurality of user devices 145. Exemplary IPMGs may include, e.g., personal telephones such as IP multicast-enabled cellular telephones at the homes of family members for whom a dedicated multicast group is set up; multiple user devices at one or more business locations; user devices in a geographic neighborhood; user devices such as a group of advertising displays distributed throughout a region; or a plurality of identified user devices associated with any group or community of interest. In the illustrative implementation, all of the user devices that are registered as members of a multicast group may receive and play the message sent to the IP multicast address of that group at substantially the same time.

Figure 3:
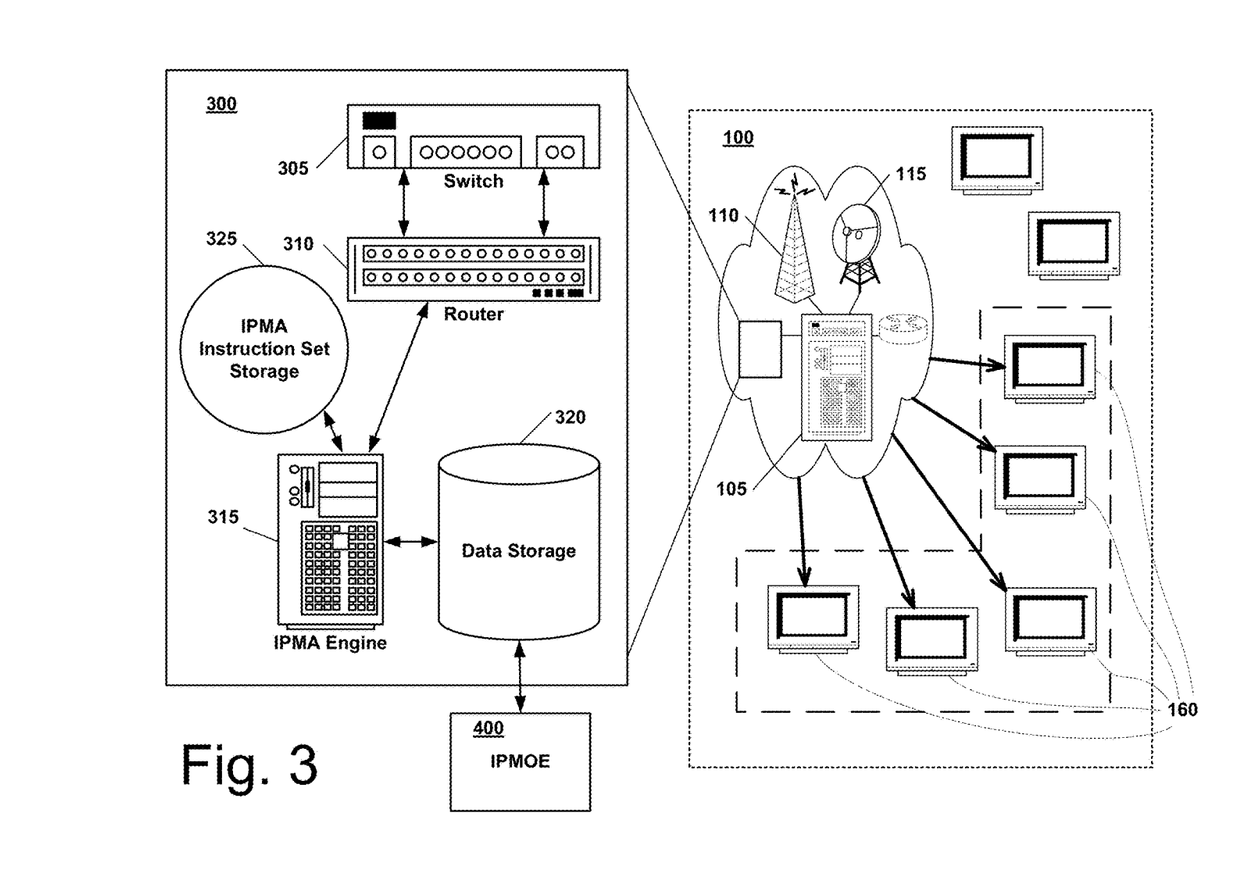
FIG. 3 is a block diagram showing components of an exemplary IP multicast system, in accordance with aspects of the disclosure.

FIG. 3 is a block diagram showing components of an exemplary IP multicast system, such as system 100 of FIG. 1. FIG. 3 includes an exemplary IPM environment 300, in accordance with an embodiment. As shown in FIG. 3, IPM environment 300 may interface with or be combined with one or more components of local office 105. IPM environment 300 may include switch 305 and/or router 310, one or both of which may cooperate with IPM engine 315 to provide messages to be processed by IPM engine 315. For example, switch 305 and/or router 310 may be used to communicate with incoming signal sources, such as RF antenna 110 satellite dish 115, optical fiber line, physical media (e.g., compact disk, portable hard drive, etc.), or other means. Further, IPM engine 315 may cooperate with data storage 320 and/or IPM instruction set storage 325, which in any combination may operate to provide information and instructions needed to implement and execute an IPM process, for example, as part of an IPM application.

Illustratively, IPM instruction set storage 325 may store one or more instruction sets to instruct IPM engine 315 to send multicast messages, using appropriate packets, to user devices 145 of exemplary IPM group 150 over IP multicast system 100, according to a selected or determined IPM process that may be utilized, for example, by one or more IPM applications. In the illustrative operation, such an IPM process may include a set of rules that prescribes the manner in which an IPM message is to be constructed and packetized for transmission to an IPM group address corresponding to an IPMG comprising a plurality of registered user devices 145, for example.

IPM applications may be used to implement functionality not available in the prior art. For example, an illustrative IPM emergency messaging application may be implemented using the herein described systems and methods to extend or supplement the Emergency Alert System (EAS) to send audio, visual, and/or audio/visual messages to user devices that are members of one or more IPMGs.

The EAS can include cable, broadcast, and satellite television and/or radio, at least a portion of which may be operated by one or more multi-system operators (MSOs), for example. Messages in the EAS may be composed of four parts: a digitally encoded Specific Area Message Encoding (SAME) header; an attention signal; an audio announcement; and a digitally encoded end-of-message marker. The SAME header may include information about who originated the alert (e.g., the President, state or local authorities, the NWS, or the like), a short general description of the event (tornado, flood, severe thunderstorm), the areas affected (up to 32 counties or states), the expected duration of the event (in minutes), the date and time the alert was issued, and/or an identification of the originating station. Depending on the emergency, different sources, such as FEMA or NWS, may act as the entry point to the EAS. In the illustrative IPM emergency messaging application, an emergency message may be received in IP multicast system 100, such as via RF antenna 110. The message may be processed by IPM engine 315 in accordance with instructions retrieved from IPM instruction set storage 325 to implement IPM processes needed to realize the illustrative IPM emergency messaging application. Thereby, the message may be multicast to one or more appropriate IPMGs 150.

Thus, a multicast enabled emergency messaging application may allow any IP enabled device, such as a cell phone, iPod, TV, PC, house lighting (e.g., overhead lamps, outdoor lighting, etc.), and the like, to indicate the presence of an EAS message and/or to convey the EAS message. Presence of the message may be indicated, for example, by flashing IP-enabled building lighting in a selected sequence, or sounding IP-enabled sirens and/or alarms. The message itself may be conveyed, for example, via properly formatted audio, visual, and/or audiovisual messages delivered to IP-enabled televisions, telephones, PCs, and the like, that are registered members of relevant IPMGs.

In an illustrative implementation, the members of an exemplary IPMG 150 may have a hierarchy and attributes. Moreover, the members of an IPMG may include one or more other IPMGs, such that IPM messages may be sent substantially simultaneously to members of different groups. Thereby, IP-enabled devices may be effectively combined in various predetermined ways depending on the circumstances in an IP multicast context. For example, one type of EAS message is called an AMBER Alert. AMBER is an acronym for "America's Missing: Broadcasting Emergency Response." An Amber Alert is a child abduction alert bulletin issued upon the suspected or known abduction of a child. AMBER Alerts are distributed via cable television systems as well as commercial radio stations, satellite radio, and broadcast television stations. Alerts may be distributed via the EAS, and also via other messaging methods, such as e-mail and SMS text messages to wireless devices, for example.

Those interested in receiving AMBER Alerts (or any other emergency messages, such as police and weather alerts) may register as members of an appropriate IPMG that is targeted to a particular neighborhood. Information in an AMBER Alert may include, for example, the name and description of the abductee, a description of the suspected abductor, and a description and license plate number of the abductor's vehicle, if available. AMBER Alerts may be multicast, such as from local police, to all user devices 145, such as all IP-enabled devices in a particular geographic area, or in a combination of areas, or in a particular requesting IPMG 150. In addition, an alert may be multicast to different types of user devices. For example, an audio/visual alert may be generated and multicast to televisions in an area, a visual alert may also be generated and multicast to LED billboards in the same area, and an audio alert may be generated and multicast to cable radios in the same area. Of course, other combinations of IPMGs are also possible, and may be selected according to the circumstances.

Another illustrative application may supplement a local broadcast by repurposing locally transmitted content for multicasting to user devices 145 that are members of one or more IPMGs 150. For example, a broadcast containing information of an event may be received by an RF antenna, such as antenna 110. The broadcast may be converted to an IP multicast, and transmitted to appropriate user devices 145, for example, to televisions within a desired or required geographic area, such as the area within range of the broadcast. Alternatively, such local multicast capability may allow a provider of the IP multicast to compete directly with, or cooperate with, RF broadcast antennas. For such an embodiment, the various user devices 145 may first determine their geographic location (e.g., via use of a global positioning system), and can then consult a database listing multicast groups that correspond to nearby geographic areas to identify one or more multicast groups that are geographically local. The user devices 145 may then subscribe to, or join, those multicast groups by informing their respective CEs or routers.

In yet another illustrative application, advertising messages, such as commercial messages, may be multicast for display on IP enabled LED billboards. Such digital signage may include content or "channels" transmitted to user devices 145, such as for displays located at retail outlets, sports arenas, theaters, electronic billboards, and the like. The messages may be static or dynamic, black and white, grayscale, or colored, including one, two, or any number of colors or any color palette. The messages may comprise text only, text and graphics, graphics only, graphic with scrolling text, dynamic graphics, video, and the like. The messages may cycle through a series of text, images, and/or videos in any desired order, with each message being displayed with any desired frequency or duration. The messages may be displayed on a single display, or a combination of displays for broader coverage, or to achieve a coordinated distributed effect.

In an illustrative operation, a coordinated distributed effect may be achieved by sending different messages to user devices that are physically aligned as desired, such as aligned visually from a preferred vantage point, such that the substantially simultaneous display of different messages on visually related billboards or other displays provides a desired distributed visual effect. For example, a text message may be made to appear to scroll across two displays separated by a distance, such as by sending a scrolling message to one display located to the left of another display from a particular vantage point, and sending the same message with a delay to the other display located to the right. Many distributed effects may be achieved by coordinating the display of a message, such as on different billboards, with a delay, or coordinating the display of different messages, or a desired combination of those, on a plurality of billboards or other user devices 145, such as in an IPMG 150. Analogous and different effects may be achieved by coordinating audio messages on a plurality of user devices 145 able to play audio, or by coordinating any or all of audio, visual, and text messages on a plurality of user devices 145, for example. For example, an incoming emergency message may involve flashing household lighting in a predetermined pattern, with emergency message text displayed on computer displays, television screens and mobile devices within the user's home.

A select IPM application may be modified by an operator (not shown) of IPM engine 315, such as to define and/or adapt one or more rules or processes of an IPM application to the specific needs of one or more particular IPMGs 150. For example, an IPM tornado warning may be implemented in connection with an emergency message received from the National Weather Service regarding a tornado watch applicable to a particular geographic region. To do so, an operator may initiate an EAS application that sends a message regarding the tornado watch to select devices, such as digital billboards and televisions, that are disposed in the selected area. Later, a tornado warning may be received in connection with an actual tornado reported touching down in an adjacent area. The operator may then adapt the EAS application to send a more urgent tornado warning message to devices in the vicinity of the actual tornado, and the urgent, localized EAS may also include control signals to remotely-controllable devices, such as personal computers, for example, to power up for display of the tornado warning message.

Further, the exemplary IPM application may include rules for sending messages to select IPMGs 150 substantially simultaneously for predetermined conditions, such as in the aforementioned EAS application. For example, different types of multicast-enabled video, audio, and text display devices may be selected for simultaneous, coordinated operation, such as, for example, in connection with a New Year's celebration.

Figure 4:
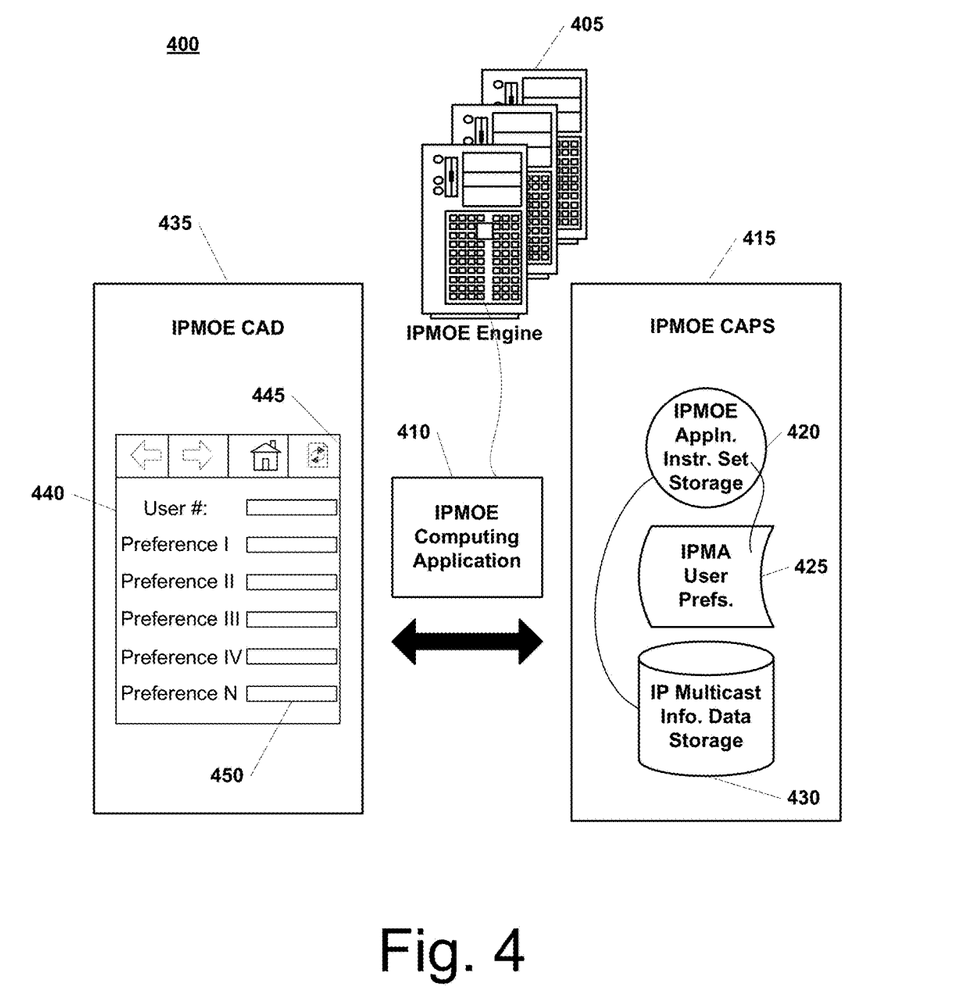
FIG. 4 is a block diagram showing components of an exemplary IP Multicast operating environment, in accordance with aspects of the disclosure.

FIG. 4 is a block diagram showing cooperating components of an exemplary IP Multicast Operating Environment (IPMOE) 400 for managing one or more IPM applications and/or data used by one or more IPM applications, such as IPM applications for IP multicast system 100 of FIG. 1. As shown, IPMOE 400 may include IPMOE engine 405, IPMOE Administrator Console (AC) 435, and IPMOE Computing Application Processing and Storage (CAPS) 415. IPMOE engine 405, AC 435, and CAPS 415 may cooperate with an IPMOE computing application 410 to supplement or modify one or more IPM instruction sets or data, and/or to manage the operation of one or more IPM Engines (315). Further, as is shown, IPMOE CAPS 415 may include or cooperate with IPMOE application instruction set storage 420, IPM customer preferences 425, and/or IP multicast information data storage 430, which in any combination may provide information needed to implement and execute one or more IPMOE computing applications 410.

In an illustrative implementation, IPMOE AC 435 may generate or display one or more application screens 440 for use in inputting and/or displaying data used or generated by IPMOE computing application 410. Illustratively, application screens 440 may include navigation controls 445, data input and/or display boxes 450, and the like, for use in inputting and/or displaying IPMOE application instructions, information, and/or other data, IPM application customer preferences 425, IPM application status, execution progress, results, and the like, which are characterized collectively herein as IPMOE information.

In an illustrative operation, a provider's administrator (not shown) may configure and/or adapt IPMOE computing application 410, using IPMOE AC 435 (e.g., via screens 440), to input and/or display application instructions, data, customer preference data and the like, such as to provide one or more program options and/or user preferences. The inputted data may be used by IPMOE engine 405 in processing IPMOE computing applications 410, and IPMOE computing applications 410 may be used to modify and/or manage the operation of IPM applications, instructions, and/or data.

In an exemplary operation, IPM customer preference data may be used to set up or modify IP multicast distribution trees, instead of or in addition to multicast trees constructed and/or updated by network nodes or by user devices. For example, one or more user devices of one or more particular customers may be included in a select IPMG, illustratively identified by the IP multicast address 239.1.1.1, by operations initiated and/or managed by a provider administrator. For example, the administrator may send a signal to one or more user devices identified, for example, using stored customer preference or other customer account data, and directing the user devices to register with the IPMG with address 239.1.1.1. A similar process can be used by the administrator to direct select user devices to withdraw from that IPMG. Thereafter, an IPM message sent to 239.1.1.1 would be received by the newly registered user devices, and not by the newly withdrawn user devices. Thereby, IPMGs may be centrally managed and/or modified.

The customer account data may include, for example, any of the customer's address, geographic location (e.g., latitude and longitude), information of the user devices at that location, and the like. The customer preference data may include, for example, one or more rules and/or options specific to or selected by that customer. Such rules and/or options may include, but are not limited to, receiving multicasts of a particular type, or from a particular party, or originating from a particular area, and the like. A rule may define an additional script or subroutine to be performed in response to receiving a predetermined multicast message. For example, a light fixture circuit can be configured to automatically flash in a predetermined pattern in response to an Amber alert message. In this manner, an IP multicast message can serve as a trigger for further action. Illustratively, the customer's preferences may be established by storing those preferences in conjunction with or associated with the customer's account information. Illustratively, the stored preferences may be accessed by an IPMOE application, or they may otherwise be made available for use by the IPMOE application. After a customer's preferences are established, an IPM message may be received, for example, by any set or subset of user devices of that customer (e.g., TVs, computer displays, IP radios, IP enabled mobile phones, etc.) in accordance with those preferences.

Figure 5:
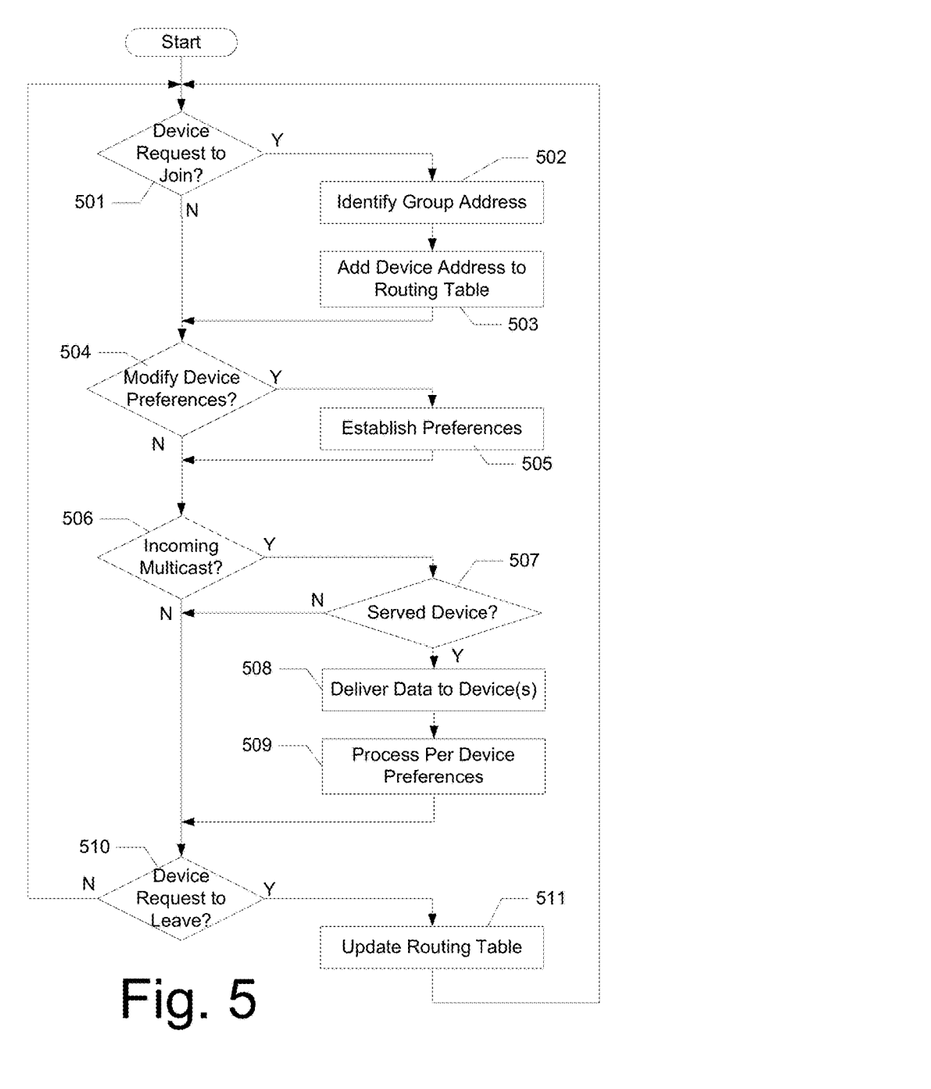
FIG. 5 is a flow diagram showing an exemplary method of IP Multicasting in accordance with aspects of the disclosure.

FIG. 5 illustrates an example looping process that can be executed by a multicast-enabled CE device (e.g., a multicast enabled gateway having a modem configured to communicate with local office 105) to extend multicast capabilities into user devices located in the home. In step 501, the CE may determine whether a request has been received from an end user user device to join a multicast group. The request can be generated in a variety of ways. For example, a user of the user device may use the user device to browse a listing of available groups using, for example, an Internet Protocol browser. For example, different multicast groups can be established for different network television stations and sources of video content, and the user can use the user device to browse a listing of available programs. When the user finds a program of interest, the user can select the program on the user device, and the user device can then transmit a message to the CE, asking to join a multicast group that carries a stream of the requested program. The request can be transmitted using any whatever communication protocol the user device uses to communicate with the CE (e.g., Ethernet, IEEE 802.11 wireless, etc.), and can identify the requested content (e.g., a Uniform Resource Locator or IP address obtained from the program listing) as well as the user device (e.g., via its IP address).

In step 502, the CE can begin the process of adding the requesting user device to the requested group by identifying the multicast group address for the stream carrying the requested program. This identification can include, for example, simply examining the user device's request, if the multicast group address was in the user device's join request. Alternatively, the CE can use the information from the request (e.g., the URL), and consult an external database to obtain the address for the multicast group carrying the requested program stream. In this step, the CE can also confirm that the requesting user device (or user) is entitled to access the requested content by, for example, transmitting an identification of the user device or user to an entitlement server.

In step 503, the CE can add the user device's address to an internal routing table that lists the user devices who are subscribing to this multicast group. The CE can also transmit the update upstream, to a router at the local office 105, and that router can do the same.

In step 504, the CE can determine whether any user device has requested to modify its multicast preferences. As discussed above, a customer can establish preferences for various multicast groups to define how it would like its incoming multicast messages to be handled. For example, the user device can define one or more additional devices to which a message should be sent when a particular multicast message is received at the CE. For example, a home lighting system might lack IP multicast capability. A requesting user device (e.g., the user's television, or computer, or other computing device) could request that when an incoming multicast EAS message arrives at the CE, it should be forwarded to the subscribing user device, and that a flashing control signal should also be generated by the CE and transmitted to the lighting system controller. Such a modification request can be received as part of the user device initially joining a group (e.g., it can be part of the original join request, or it can be a separate message sent by the user device after the group is successfully joined). Alternatively, the home lighting system (or other home devices, such as refrigerators, ovens, stove tops, coffee makers, garage door openers, alarm systems, etc.) can be configured with IP multicast routing and stack computing power and memory resources.

In some embodiments, the user preferences can include generating multicast messages from non-multicast sources. For example, an incoming television signal (e.g., an Advanced Television SubCommittee—ATSC signal) may be automatically converted to a digital format (e.g., to MPEG4) and transmitted as a multicast (or series of unicast) signal to multiple user device devices within the home.

If a modification request has been received, then in step 505, the CE may establish the preferences for the requesting user device. This can include, for example, determining the identity of the multicast group(s) that are affected by the preference. For example, the user device requesting modification can identify the multicast group address(es) that are relevant to the requested preferences. The preferences can include identification of one or more multicast message types (or message contents) that can trigger different kinds of responses. For example, an EAS message containing the word "flood" may result in a different set of responses from a message containing the word "fire." The CE can obtain information identifying the preference parameters and the steps to be taken (e.g., a script to be executed when a corresponding multicast message has been received) when such a message is received by, for example, querying the user.

In step 506, the CE can determine whether an incoming multicast message has been received. This can occur, for example, by determining whether the destination value for an incoming packet is one for a multicast group in the CE's routing table. If it is a multicast packet, then in step 507, the CE can determine whether any of the user devices that are served by the CE are subscribed to the multicast to which the packet belongs. If there are subscribing user devices in the CE's routing table, and if those user devices are being served by the CE (e.g., a subscribed user device has not left the service range of the CE's wireless router), then in step 508 the CE can deliver a copy of the multicast message (or packet) to the subscribed user device (or CPEs, if there are multiple subscribing CPEs being serviced).

In step 509, the CE can also perform any additional processing that may be required in view of the customer preferences established in step 505. For example, an incoming EAS alert message may result in the CE also sending a signal to a home lighting system to flash the lights in the house.

In step 510, the CE can determine whether a user device has requested to leave a group. This can occur, for example, if the user decides he/she is no longer interested in viewing a particular content or service. If such a request has been received, then the CE can proceed to step 511, and update its routing table to remove the user device. If the user device was the last subscribing user device served by the CE, the CE can transmit a message further upstream to inform, for example, a router at the local office 105 that the CE no longer has any subscribers. That local office router can then send the message further upstream if, for example, there are no other CEs served by the router who have subscribing CE's, and in this way, the spanning tree for the multicast group can be pruned to remove branches that do not require that particular multicast.

In some embodiments, the features above may be used to provide an alternative to traditional broadcast content. Linear broadcast video can be encoded at a source computing device, and transmitted as a multicast IP stream. For example, a multicast group can be created for the HBO service, and a user's user device can subscribe to the multicast group in order to receive and view HBO content. The HBO server may transmit a multicast stream of HBO content to reach the various CEs and end user user devices, and through the use of spanning trees and pruning, bandwidth can be conserved by avoiding transmitting the stream to CEs that do not have any members of the multicast group.

By using the multicast stream to deliver the content, a router at the local office 105 has the opportunity to intercept and interrupt the stream as needed. For example, if an EAS needs to be delivered, the router can buffer the incoming multicast packets for the various streams that it is sending downstream (e.g., the HBO stream mentioned above), and transmit its own EAS multicast packets to the multicast group addresses downstream (e.g., to the various CEs and intermediate routers). In this way, an emergency message can be received at the CEs and propagated to the end user devices, without disturbing the user devices' process of receiving, decoding and displaying the streams' content.

In some embodiments, multicast streaming can replace conventional over-the-air broadcast radio. A radio station's server can encode its audio content and transmit it as a multicast stream to various subscribing CEs, which can use one or more wireless network routers to make the content available to subscribing wireless-enabled user devices (e.g., portable computers, smart phones, etc.).

In some embodiments, content in the multicast stream can be delivered in an encrypted format, and can require a decryption key to decode and interpret. Content providers can then control access to their multistream content by controlling access to the decryption keys. For example, a user who has paid for access to HBO might receive a time-limited decryption key, which their user device may use to decrypt the HBO stream's content.

In some embodiments, a user device may be subscribed to multiple multicast streams at once, and can receive multicast content from all of those streams, even in situations where only one stream is currently being actively consumed. For example, a user may subscribe to streams for several services, such as HBO and Showtime. The user's subscription may permit his/her user device (e.g., a personal computer) to receive, decrypt and display the audiovisual content from either of those streams. The user might be viewing one stream (e.g., HBO), when a particular multicast message is delivered on the other stream (e.g., Showtime). For example, the user may set a preference indicating that he/she would like to be alerted whenever a particular event occurs on Showtime, and even if watching HBO, the user's user device may still be subscribed to and receive the Showtime stream, and will be able to overlay multicast content from the Showtime stream over the HBO content that is currently being displayed.

Figure 6:
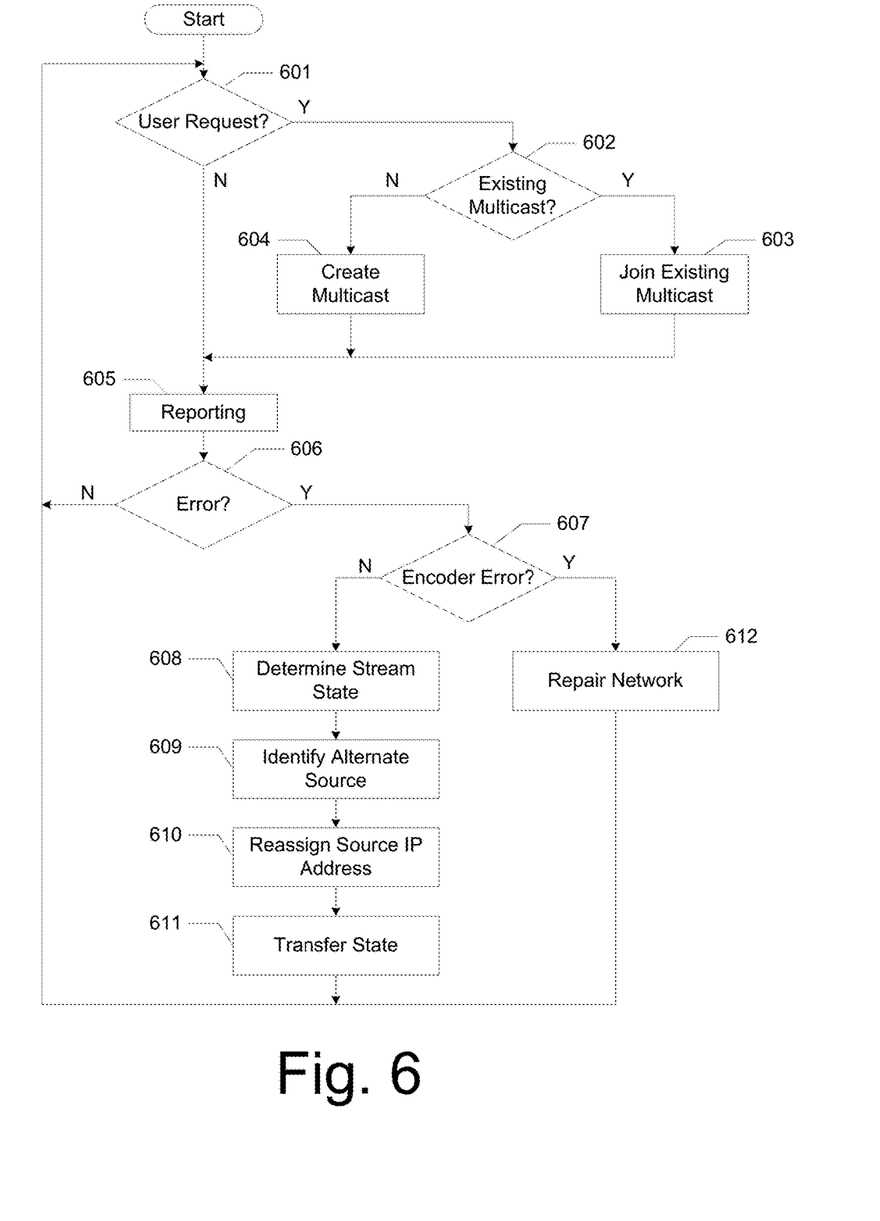
FIG. 6 is a flow diagram illustrating another example multicasting method.

FIG. 6 illustrates an example process that may be performed by one or more computing devices in a content delivery system, such as a content server in a video delivery system. In step 601, a content server may determine whether a new request has been received for content. The request may be, for example, a user requesting to view a video using a tablet computer's Internet browser, and beginning at a point in the program (e.g., its beginning, 10 minutes into the program, or any other desired point). If such a request has been received, then in step 602, the content server may determine whether an existing multicast stream has been established for the requested content that is suitable for the request. For example, if the request was to view a stream of a scheduled broadcast (e.g., this evening's nightly news program) beginning at whatever point in the program is currently being broadcast, then a multicast stream may already exist for the delivery of that program. In such an event, the content server in step 603 may simply instruct the requesting device to join the existing multicast stream. This instruction may include an identification (e.g., an IP address) of the multicast stream, which the requesting device can then use to send a request to join that stream and begin receiving its content.

If there is no existing multicast that will satisfy the request (e.g., no other stream is currently carrying the requested program, or the existing stream(s) carrying the requested program are currently transmitting at a point different from the requested starting point), then in step 604 the content server may initiate a multicast stream to carry the requested content, and inform the requesting client device of the address for subscribing to the multicast.

In step 605, the various client devices that have subscribed to a multicast, and the various intermediate routers handling this traffic, may report their multicast membership to the content server. This may occur periodically (e.g., once every 10 seconds) using a short maintenance or heartbeat message that identifies the client device and the multicast stream. The content server may maintain a database of the membership list for a particular multicast stream, and can use this database to isolate a source of an error. This centralized management may obviate and avoid the localized membership reporting used, for example, in the Internet Group Management Protocol, Version 3, protocol, in which members report their membership to multiple nearby routers. Avoiding this can help reduce the memory and processing required for the routers.

In step 606, the content server may determine whether there has been an error with its multicast transmission. Determining the existence of an error may be accomplished in a variety of ways. For example, error messages and responses from clients may indicate to the content server that the requested stream data is no longer being received, or is being received in an unacceptable quality. Alternatively, the clients may be required to transmit periodic heartbeat messages indicating that the multicast stream is still being successfully received, and absence of such a heartbeat can signal an error. As another alternative, network probes may be used to identify error conditions—for example, a video probe could determine a video source error, and that determination can be used to trigger a failover to a standby source.

In step 607, the content server may determine where the error resides. The error can be either in the source encoder (e.g., a server responsible for retrieving/encoding/transmitting the content for the stream) or in the network of intermediate routers between the source encoder and the requesting client. To isolate the error, the content server may consult the membership database, and determine whether errors are reported by clients throughout the network, or if the errors are isolated to those served by a particular node in the network. If the error is determined to be at the encoder, then all of the members will eventually be reporting an error with the stream. However, if the error is merely with the source encoder, then the existing IP multicast group can remain in effect. Instead of tearing down the multicast group and re-establishing a new one, the content server can simply reassign the encoder's source IP address to a new encoder. To do this, in step 608, the content server may store information identifying the prior state of the multicast transmission. This state information can include information identifying the content being streamed, its file locations and manifest file, the last known position of the playback, the membership list, and any other relevant information for the stream.

In step 609, the content server can identify an alternate source encoder to replace the one experiencing the error. This may be accomplished, for example, by having the content server store information identifying one or more alternate encoders for each multicast stream. In step 610, the content server may reassign the original source encoder's IP address to the alternate source encoder, which can entail terminating the original source encoder's lease on the IP address, and granting it to the alternate encoder instead. In step 611, the content server may transfer the stored state information to the alternate source encoder. From there, the alternate source encoder may begin to encode and transmit the content for the multicast stream. The various clients that had joined the multicast group may then resume receiving the requested content. If, in step 607, it is determined that the error is not in the encoder, then one or more nodes in the content delivery network will need to be repaired and/or routed around. In step 612, this can be accomplished, for example, by using the membership list information stored above to re-route the multicast traffic to get around the problem router(s).

It should also be noted that the disclosed embodiments may be implemented in a variety of IP multicast environments, including both wired and wireless devices and systems. The various techniques described herein may be implemented in hardware, or a combination of hardware and software. The systems and methods disclosed herein may be implemented using programmable computers that include a processor, a storage medium readable by the processor (that may include volatile and/or non-volatile memory and/or other storage elements), at least one input interface, and at least one output interface. Computing hardware cooperating with various instruction sets may be applied to data to perform the functions described herein and to generate IP multicast messages. The IP multicast messages may be received by one or more user devices or groups of user devices. Software programs used by the exemplary computing hardware may be realized using various programming languages, including high level procedural or object oriented programming languages, assembly, or machine language, which may be compiled or interpreted to cause the computing hardware to operate in accordance with the herein disclosed systems and methods.

The various illustrative logic, logical blocks, modules, data stores, applications, and engines, described in connection with the embodiments disclosed herein may be implemented or performed using a general purpose processor, a digital signal processor (DSP), an application specific integrated circuit (ASIC), a field programmable gate array (FPGA) or other programmable logic device, discrete gate or transistor devices, discrete hardware components, or any combination thereof, able to perform the functions described herein. A general-purpose processor may include a microprocessor, or may include any other type of conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of computer readable data storage medium known in the art. An exemplary storage medium may be coupled to the processor, such that the processor can read information from the storage medium. Alternatively, the storage medium may be integral to the processor. The processor and the storage medium may reside in an ASIC. Alternatively, the processor and the storage medium may comprise discrete components. Additionally, in some aspects, the steps and/or actions of a method or algorithm may reside as one or any combination or set of instructions stored on a machine readable storage medium such as a computer readable storage medium.

Those of ordinary skill in the art will recognize that many modifications and variations of the disclosure may be implemented without departing from its spirit or scope. Thus, it is intended that the disclosure cover the modifications and variations, provided they come within the scope of the appended claims and their equivalents.

What is claimed is:

1. A method of content delivery, comprising:
   receiving, by a computing device, a request from a lighting fixture to join an Internet Protocol (IP) multicast group associated with a geographic area;
   determining, by the computing device, emergency content associated with the geographic area and transmitted to the IP multicast group; and
   causing transmission of the emergency content via an Internet Protocol (IP) multicast stream from a source to the lighting fixture using an IP multicast transmission network comprising a plurality of transmission devices.

2. The method of claim 1, comprising:
   determining a need for interruption of non-emergency content based on an event occurring within the geographic area;
   inserting, in the IP multicast stream, a control instruction corresponding to the event; and
   transmitting the control instruction to the lighting fixture using a same destination multicast address used to transmit the non-emergency content.

3. The method of claim 1, wherein the emergency content comprises a plurality of controls for a plurality of IP multicast enabled devices located at a destination premises at which the lighting fixture is fixed.

4. The method of claim 3, wherein the plurality of controls comprise a first control to interrupt an ongoing media program with an alert message, and a second control to activate a light source associated with the lighting fixture.

5. The method of claim 1, wherein the IP multicast group comprises multiple different types of devices, each different type of device in the IP multicast group configured to respond differently to the emergency content.

6. The method of claim 5, wherein a first type of device in the IP multicast group is a billboard.

7. The method of claim 5, wherein a first type of device in the IP multicast group is a radio.

8. The method of claim 5, wherein a first type of device in the IP multicast group is a television, and a second type of device in the IP multicast group is a billboard.

9. The method of claim 8, wherein the emergency content generates a coordinated display of information across the billboard and the television.

10. The method of claim 9, wherein the coordinated display of information further comprises a flashing of a light source of the lighting fixture.

11. A method, comprising:
    receiving, by a computing device, a request from one or more Internet Protocol (IP)-enabled lighting fixtures to join an IP multicast group;
    receiving, by the computing device, content addressed to the IP multicast group, wherein the content comprises an emergency alert message;
    based on receiving the content, determining, by the computing device, one or more IP-enabled lighting fixtures; and
    transmitting an IP message addressed to the one or more IP-enabled household lighting fixtures, the IP message comprising an indication that the one or more IP-enabled household lighting fixtures activate one or more light sources associated with the one or more IP-enabled household lighting fixtures.

12. The method of claim 11, further comprising transmitting the IP message to the one or more IP-enabled household lighting fixtures via an IP multicast transmission network.

13. The method of claim 11, further comprising:
    determining, by the computing device, one or more IP-enabled video-enabled devices; and
    transmitting an IP message addressed to the one or more IP-enabled video-enabled devices comprising an indication that the one or more IP-enabled video-enabled devices display information associated with the emergency alert message.

14. A method, comprising:
    receiving, by a computing device, a request from a lighting fixture to join an Internet Protocol (IP) multicast group;
    determining, by the computing device, a geographic location of the computing device;
    determining, by the computing device, one or more IP multicast groups associated with the geographic location of the computing device;
    transmitting a request to join the one or more IP multicast groups associated with the geographic location of the computing device; and
    receiving, by the computing device, an emergency alert message addressed to the one or more IP multicast groups.

15. The method of claim 14, further comprising:
storing, by the computing device, information indicating an anticipated multicast message and a corresponding event;
determining that the emergency alert message indicates the anticipated multicast message; and
in response to the determining that the emergency alert message indicates the anticipated multicast message, performing the corresponding event.

16. The method of claim 15, wherein the corresponding event comprises activating one or more light sources, and wherein the performing the corresponding event comprises transmitting an indication to the lighting fixture to activate one or more light sources associated with the lighting fixture.

17. The method of claim 1, wherein the lighting fixture comprises one or more light sources and an IP-multicast enabled adapter.

18. The method of claim 16, wherein the lighting fixture comprises one or more light sources and an IP-multicast enabled adapter.

\* \* \* \* \*

UNITED STATES PATENT AND TRADEMARK OFFICE
CERTIFICATE OF CORRECTION

PATENT NO. : 10,129,041 B2
APPLICATION NO. : 13/631117
DATED : November 13, 2018
INVENTOR(S) : Danial Holden Page 1 of 1

It is certified that error appears in the above-identified patent and that said Letters Patent is hereby corrected as shown below:

In the Specification

Column 12, Detailed Description, Line 35:
After "user", please delete "user"

Column 13, Detailed Description, Line 36:
After "user", delete "device"

Column 14, Detailed Description, Line 30:
After "user", delete "user"

In the Claims

Column 19, Claim 18, Line 19:
Delete "claim 16," and insert --claim 14,--

Signed and Sealed this
Fifth Day of March, 2019

Andrei Iancu
*Director of the United States Patent and Trademark Office*